Nov. 13, 1945.   M. C. SCHWAB   2,388,873
COMBAT VEHICLE
Filed Feb. 9, 1942   3 Sheets-Sheet 2
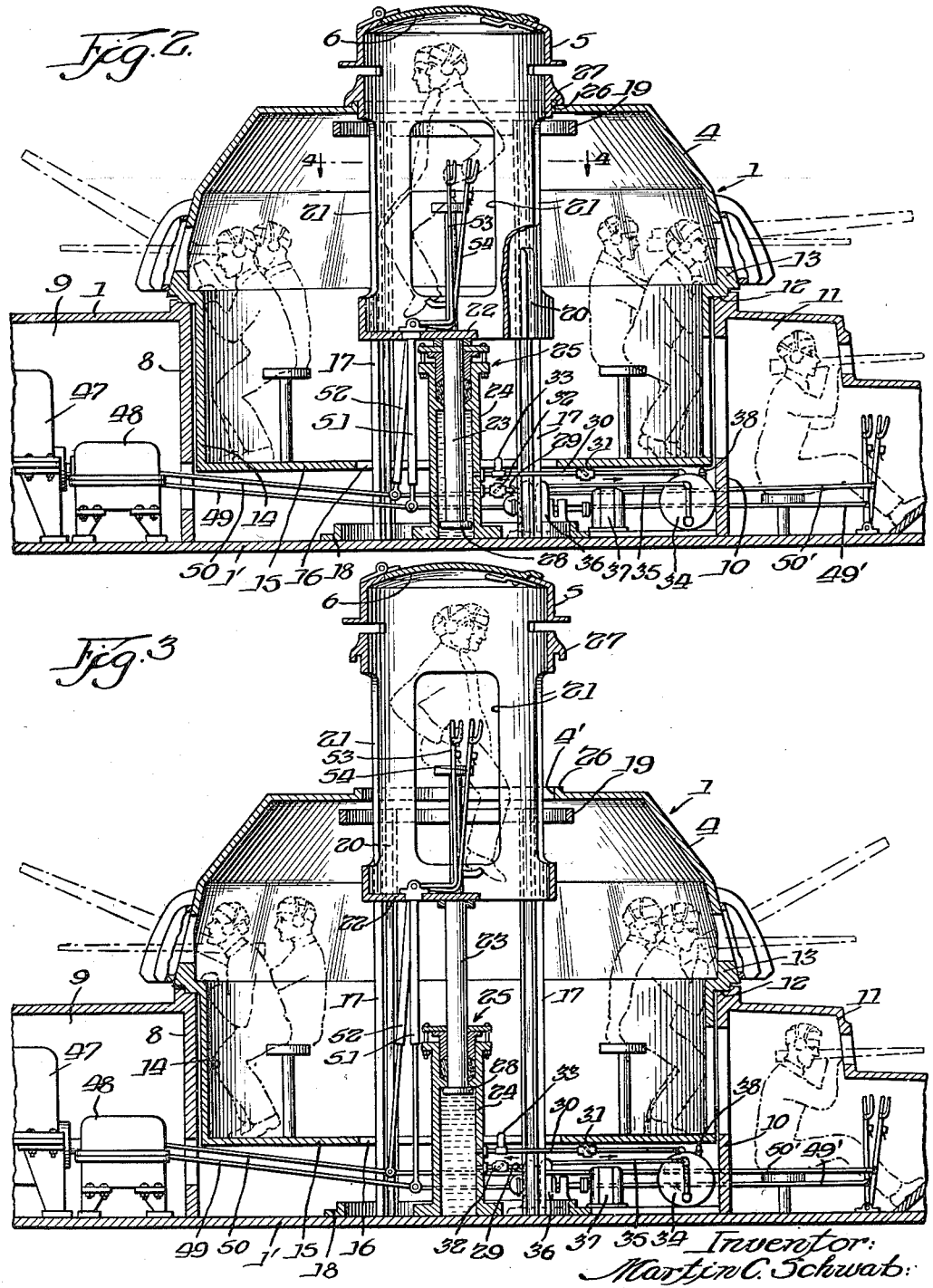

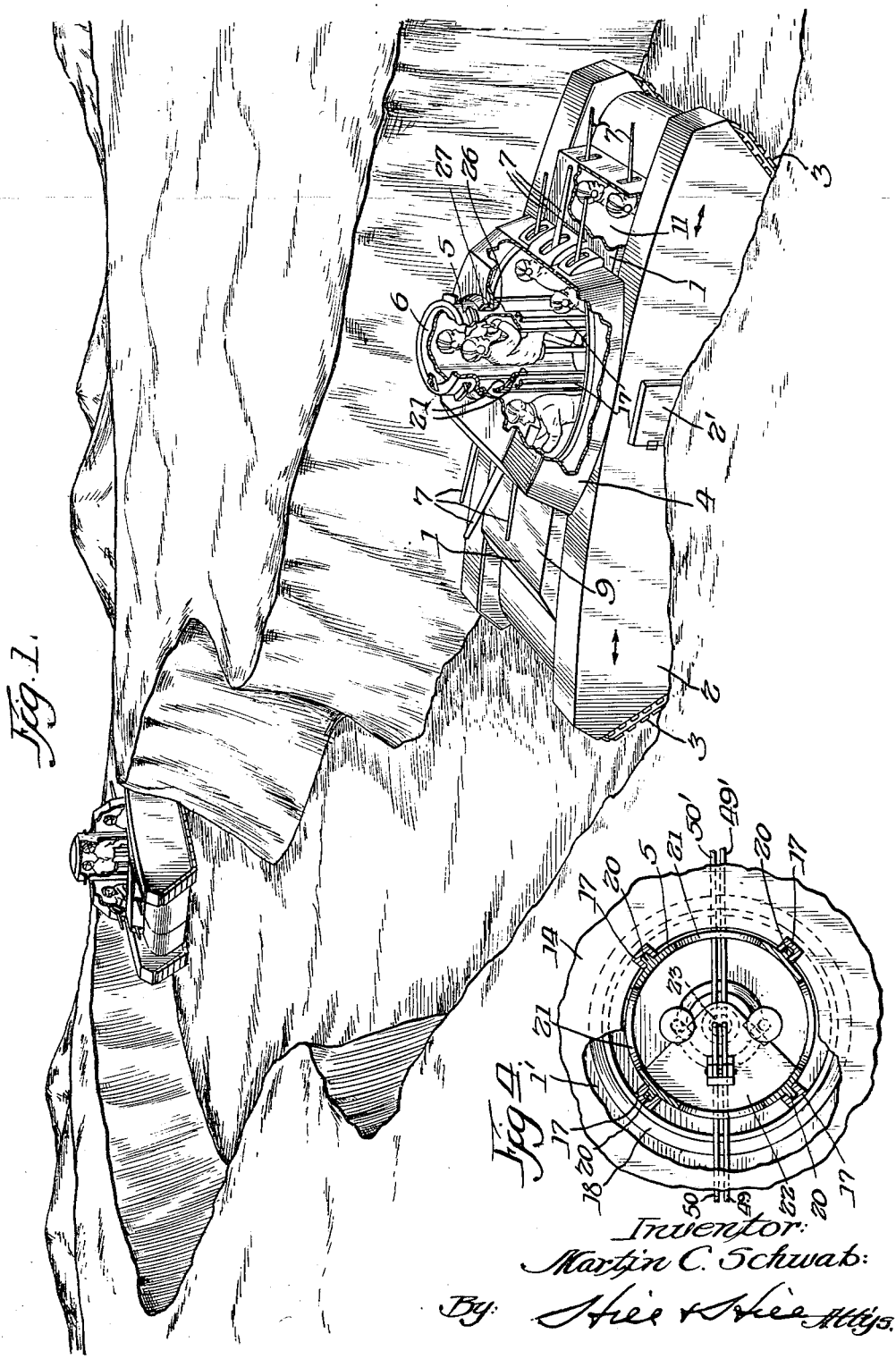

Nov. 13, 1945.   M. C. SCHWAB   2,388,873
COMBAT VEHICLE
Filed Feb. 9, 1942   3 Sheets-Sheet 3

Inventor:
Martin C. Schwab
By: Hier & Hier Attys

Patented Nov. 13, 1945

2,388,873

UNITED STATES PATENT OFFICE 2,388,873

COMBAT VEHICLE

Martin C. Schwab, Chicago, Ill.

Application February 9, 1942, Serial No. 429,966

7 Claims. (Cl. 89—36)

My invention belongs to that general class of devices particularly intended for national defense, and more particularly to combat vehicles, and especially that type of vehicle generally designated as tanks, which consist of suitable running gear and an armored body mounted thereon carrying guns and ordnance.

My invention has among its objects the production of an efficient and particularly simple combat vehicle or tank capable of being heavily armored, which may be handled in a manner to provide for the most satisfactory, efficient and direct action in service and operation.

More especially it has as an object the production of a vehicle of the kind described which may be driven forward or rearward without requiring turning around when in action and in which the commanding officer may control the same from a conning tower, permitting vision to the front, to the rear or to the sides through a range of three hundred and sixty degrees. It has as a further object the construction in which in emergency the vehicle may be taken over and controlled from a second station by a crew member or gun crew.

It has as a particular object the production of a vehicle of the kind described in which the commanding officer or pilot may from a central control tower direct and control the forward or rearward travel of the tank, and by turning about in the tower face the direction in which the tank is moving, having unobstructed vision in the direction of travel whether running ahead or back. The commander can from the tower, without turning the tank around, advance or retire. This is very important.

The present methods of driving as heretofore practiced provide no alternative in case of a tank being required to turn promptly in case of an enemy attack or retreat, the same requiring considerable time and a great length or open space for turning movement as they are at present operated. Such requirement may occur in a deep ravine where a turn cannot be made on account of embankment, etc., or obstacles such as ravines, or water streams, without taking a hazardous movement, and this is one of the deficiencies in the present method of driving.

The present arrangement of the center drive as shown permits the vehicle to be immediately reversed in case of enemy attack, or from a position where turning cannot be done, and which might result in a fatal enemy attack when making a slow down turning movement, during which time the side of the tank may be exposed to enemy fire.

The particular point and advantage of the center drive control is that it does not require turning around of the vehicle in case of sudden retreat on the approach of the enemy, or obstruction, etc., but the driver can immediately turn around or face about in the tower or at the control and drive in the opposite direction, without loss of time, slowing down, or avoiding a broadside view of the tank against enemy attack. An alternate drive can be had as now in use in case the control of the center conning tower is disrupted.

Under the present methods of driving and controlling tanks, the driver may be going down hill and run into deep ravines where he could not see the enemy approach and it would be impossible to turn until he reached open country, and then it might be too late on account of the exposure and inability to turn around to get away from an unexpected enemy attack. In extremely soft ground, should the tank bog down, it might be impossible to turn around or at least be most difficult, and in this instance should it occur by virtue of the method of controlling and driving the tank, it might readily be reversed or back-tracked, permitting the tank to be readily extricated and in a minimum of time.

It has as a further object the production of a combat vehicle of the kind described in which the conning tower may be automatically gradually extended or elevated to the desired extent so as to permit observation for a greater distance, or which may in battle be retracted to afford greater protection to the pilot or commanding officer, as well as to reduce the visibility of the tank from observers of the enemy.

The invention has among its further objects the production of a vehicle of the kind described which may be readily ventilated as desired, but which may be tightly sealed when required to prevent the admission of outside gas should the vehicle be subjected to an enemy attack.

The invention has as a further object the production of a vehicle of the kind described in which there is provided a movable turret which may be heavily armored and provided with a maximum of armament, which turret may be moved about its axis through an angle to change the angle of fire without changing the direction of travel of the vehicle or while the vehicle is or is not in motion.

Many other objects and advantages of the construction herein shown and described will be obvious to those skilled in the art from the disclosure herein given.

To this end my invention consists in the novel construction, arrangement and combination of parts herein shown and described and more particularly pointed out in the claims.

In the drawings, wherein like reference characters indicate like or corresponding parts:

Fig. 1 is a perspective view illustrating two of the vehicles with portions broken away to show the interior construction;

Fig. 2 is a longitudinal sectional view of a portion of the vehicle, the conning tower in lowered position;

Fig. 3 is a similar view showing the conning tower in its elevated position;

Fig. 4 is a sectional view taken substantially on line 4—4 of Fig. 2; and

Figure 5:
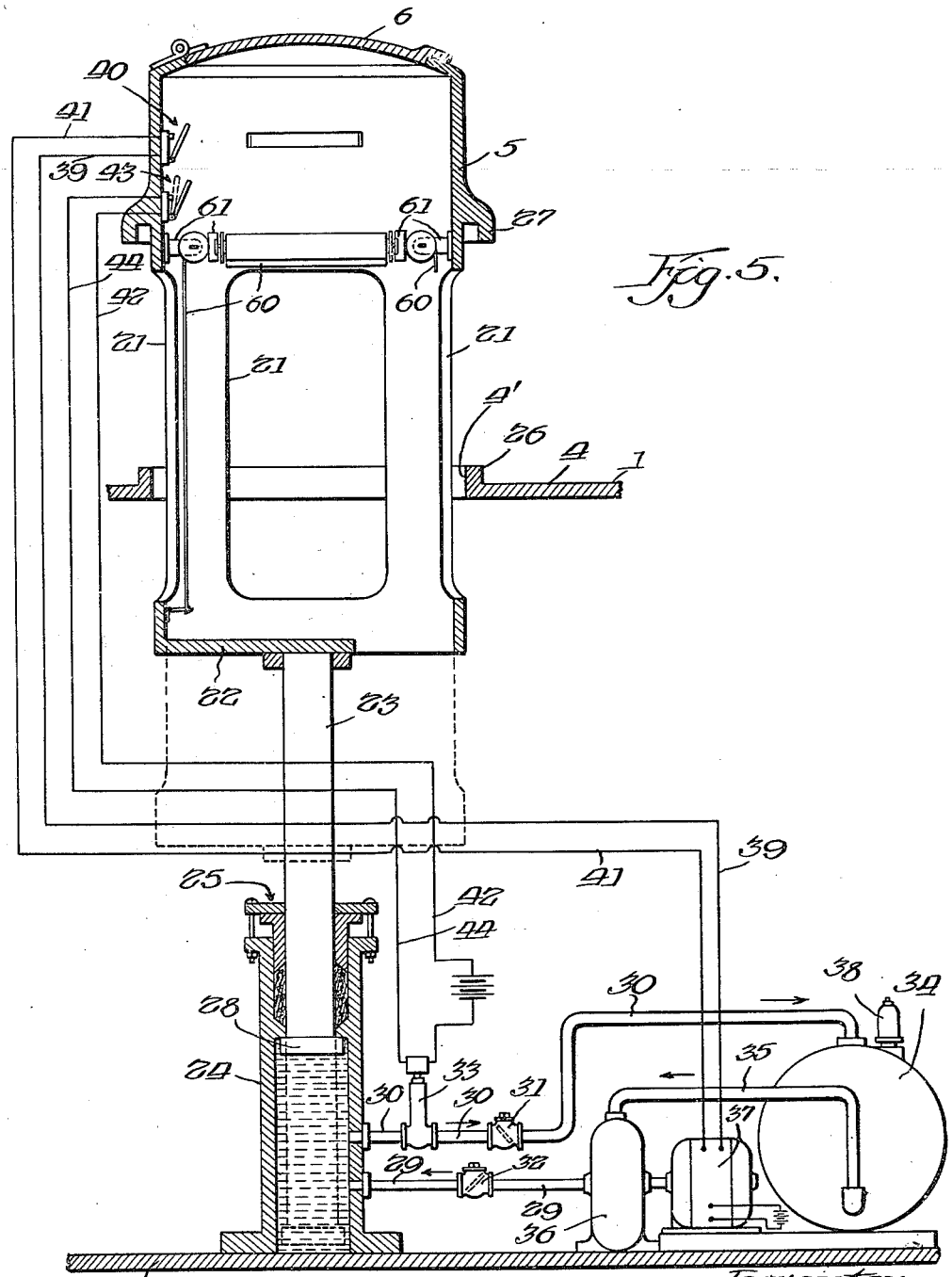
Fig. 5 is a sectional view of the conning tower and elevator mechanism, the mechanism and controls therefor being shown more or less diagrammatically.

As shown in the drawings, in which only one embodiment of the invention is shown, there is provided the chassis upon which is mounted an armored body 1, at each side of which are armored housings for enclosing the tracks or treads of the tank, a well known tractor type of vehicle drive being shown. While any type of vehicle may be used, heavy combat vehicles of this kind, which are generally known as tanks and other propelled equipment, are provided in most cases with tracks or treads which are driven by a suitable power unit, generally by a gasoline engine or by a Diesel motor through a suitable transmission, the steering of the vehicle being brought about by controlling the relative rate of travel of the respective treads, of which there is one at each side. These heavy vehicles are generally clumsy and cumbersome and require skill to operate and to turn around, and turning results in loss of time and exposure to further enemy attack when the speed is reduced. Owing to the construction and the limited room, visibility from the vehicle is more or less limited and this is particularly so on rolling ground or where vision is obscured by shrubbery and other obstacles.

In the tank illustrated there is provided a turret 4 which is preferably made movable, although not necessarily so, and which may be rotated about a central axis so as to change or increase the angle of fire without changing the direction of travel of the vehicle and also so as to give a changeable angle of firing in the event the vehicle is standing still for any reason whatsoever. The type of vehicle shown is provided with a conning tower 5 which may be provided with a closure 6, the conning tower being so supported that it may be elevated or lowered at will. In Fig. 2 the conning tower is shown in its lowered position, while in Fig. 3 it is shown in its elevated position for observation purposes or for purposes of ventilation, entrance or exit. The vehicle is shown with suitable armament such as cannon, machine guns or the like projecting from suitable gun ports both in the body and in the turret.

I have not considered it necessary to illustrate in detail the chassis and associated parts of the vehicle nor to show details of the power plant, transmission system, gun mountings, etc., inasmuch as in themselves they form no part of the present invention.

I have illustrated the body 1 as provided with a floor 1' and with a partition 8 between the turret chamber and the power unit compartment 9. I have also shown a similar partition 10 at the front of the vehicle dividing off a portion of the interior of the body into a compartment 11 for one or more gunners and also for a control room under certain emergencies. The partition 10 and the wall of the turret are provided with openings as shown so that the crew may pass from the turret to the compartment 11. There may also be an opening in each of the side housings 2 through which the crew may enter the tank, which may be closed by closure 2' as shown. The crew may also enter or leave the vehicle through the conning tower as will be hereinafter more fully described, and there may be provided such other openings for entrance or exit as found desirable.

As shown, the turret may be moved or rotated relative the body, which is shown with a runway 12 for engaging and supporting the cooperating member 13 on the turret, and it may also be mentioned that the turret may be manually or mechanically moved or rotated by power, it not being considered necessary to describe the same in detail herein. Carried by the depending wall 14 of the turret is a floor 15 preferably provided with an opening 16 through the same. As shown, guides 17 are arranged within the turret and supported from the floor thereof, the same being connected by a base member 18 at the bottom and a similar annular member 19 at the top. The guides 17 are provided with grooves which serve as guides for the conning tower 5 which is provided with the cooperating guide members 20 secured to the walls of the tower. As shown in Figs. 2, 3 and 4, the conning tower 5 is provided with a series of openings or passageways 21 in the sides thereof. The conning tower is also provided with a floor or platform 22 which in the construction illustrated only partially closes the bottom of the conning tower. Any type of elevator for the conning tower may be employed, a hydraulic elevator being shown. In the embodiment illustrated the platform or bottom 22 of the conning tower rests upon a plunger 23 which extends into a casing 24 containing a suitable fluid, as for example, oil, the plunger, casing, etc. constituting a hydraulic elevator. The raising and lowering of the conning tower is controlled by the pumping of the fluid into the casing 24 or permitting its discharge therefrom. A stuffing box 25 of any suitable type may be arranged as shown. It will be noted by referring to Figs. 2 and 3 that the turret is provided with a flange 26 arranged to seat in a groove in the annular ring 27 when the conning tower is in its lowered position shown in Fig. 1, so that it is sealed when down and is rigidly maintained against vibration.

The particular elevator mechanism shown is illustrated more or less diagrammatically in detail in Fig. 5. The lower end of the plunger 23 is provided with an end 28 which loosely fits the interior of the casing 24. This serves as a stop when the tower is elevated as is most clearly shown in Fig. 3, the casing forming a limiting stop for the tower when it is lowered as is shown in Fig. 2, it being understood that by virtue of the particular mechanism employed and control thereof the tower may be supported at any intermediate position and maintained in that position between the stops. As shown, an intake pipe 29 and a discharge pipe 30 is connected with the casing. I provide a check valve 32 in the pipe or conduit 29 and a similar valve 31 may be provided in the pipe 30. Pipe 29 is connected with the pump 36 which communicates through pipe 35 with tank 34 to which return pipe 30 is extended. The pump 36 may be driven by a suitable electric motor 37 or any equivalent source of power. The tank 34 may be provided with a relief valve 38, if found desirable, to relieve any excessive pressure in the tank 34.

Arranged in the return pipe 30 and adapted to control the passage of fluid therethrough from the casing 24 to the tank 34 is a valve 33 which is preferably controlled from the conning tower. If an electric motor 37 is provided for driving the pump 36 the motor may be controlled by a switch 40 in the conning tower connected by suitable conductors 39 and 41 to the motor terminals. While any other suitable controlling mechanism may be employed, for purposes of illustration I have shown an electrically operated valve 33 which is connected by suitable conductors 42 and 44 to a control switch 43 in the conning tower. Obviously, by controlling the valve 33 the tower may be held supported at a desired point intermediate the limiting stops previously referred to.

In Figs. 2 and 3 I have diagrammatically illustrated a power unit for the vehicle, motor 47—transmission 48, it being understood that this is merely diagrammatic, and the same may consist of any suitable source of power arranged in the compartment 9. For purposes of illustration I have shown control rods 49 and 50 extending therefrom and connected by means of suitable links 51 and 52 to the operating levers 53 and 54 which are arranged in the conning tower and which travel with it during its movement. I have also shown the rods 49 and 50 extended as at 49' and 50' to the compartment 11 at the front of the machine, so that in the event the conning tower is injured or the pilot or commander incapacitated, one of the crew or a gunner in the compartment 11 may control the vehicle.

I have illustrated curtains 60 which may be carried by brackets 61 in the conning tower for covering the openings 21 when desired (shown only in Fig. 5). Sliding panels or any equivalents for the curtains may be employed to close any of the openings 21 at such time as may be desired. When the tank is under way the tower may be elevated sufficiently to bring the openings 21 or a portion thereof above the turret and the desired curtain or curtains lowered to close the openings so that air will be forced down into the working chambers of the tank under pressure, providing ventilation. In other words, the motive power of the tank moving the tank provides for the forcing of air positively down through the tank, from which it may be exhausted through the gun openings. This forced ventilation permits auxiliary fans to be dispensed with. This forced ventilation is of great importance since large quantities of fresh air are forced into the tank, driving out foul air, engine odors and generally maintaining a lower temperature in the tank. This system permits a large volume of air to enter the tank and at the same time makes space available which would otherwise be taken up by auxiliary ventilating devices, and of course space in a tank is at a premium.

It is intended that the vehicle driving unit and its controls shall be so arranged that it may be driven forward or rearward without requiring turning around to change the direction of travel. This is possible since the pilot or commander in the conning tower is able to see forwardly or rearwardly at all times by merely turning his seat or facing about and has an unobstructed view. He is likewise able to face either way to control the direction of travel from the conning tower, it being understood that with two men in the tower either one may take over and direct the tank. The member of the crew in the compartment 11, of course, can only see in one direction, to-wit, in a forwardly direction.

When the commander desires he may elevate the conning tower, thereby extending his field of vision. Also when not under fire, the conning tower may be lifted to a desired extent when the tank is under way or standing, permitting the entrance of fresh air through the openings 21 and down through the conning tower into the interior of the vehicle, affording ventilation. The openings 21, when the tower is raised, also provide a means of entrance or exit from the vehicle. In the view in Fig. 1 the commander and pilots in the tower of the tank in the foreground are in a position to guide the vehicle in a forward movement, while in the tank in the background they are shown faced in the opposite direction, having turned around on their seats so that they may guide the vehicle during its backing up or traveling to the rear. It will be apparent from Fig. 1 that the commander with the conning tower raised can look over an obstruction that would ordinarily impair his vision, while on level ground the increased elevation would materially increase the field of vision  While I have not described the tower equipment for propelling the tank or details of the treads or tracks, it is obvious that these may be standard equipment as at present used and controlled in the conventional manner, my invention constituting a step far in advance of present structures and not heretofore contemplated.

It is also obvious that wear and strain on the tank structure is greatly reduced, since turning does put a strain on the structure and equipment, and consequently the life of the tank is definitely increased. Also elevating the commander and pilot to a direct observation post will increase the space for the firing units approximately twenty-five percent. By the tower construction, the entrance and exit openings are greatly increased in number and in the event of overturning the crew has better opportunities to escape. Likewise, by avoiding turning, the road bed is better preserved and wear on the treads or tracks reduced. Also the pitching about of the crew in turning is avoided, thereby adding to the comfort of the crew as well as preventing injury to them.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a combat vehicle of the kind described and in combination, a chassis provided with a power unit for driving the same, an armored body mounted on said chassis, a gun turret movably mounted on said body, a vertically movable conning tower mounted on the body with its major portion adapted to be contained within the turret and its upper end projecting through an opening in the top thereof, means within and moving with the tower for controlling the driving of the vehicle power driving unit and other means within the tower for controlling the elevating or retracting of the tower at will.

2. In a vehicle of the kind described and in combination, an armored body and means for carrying the same, means for propelling said vehicle forwardly or rearwardly, a vertically movable conning tower disposed on the body provided with observation ports at the front and rear sides thereof, and means for controlling said propelling means to advance or retire the vehicle, said control means having controls located in the tower, whereby the vehicle may be driven at the will of the occupant of the tower.

3. A vehicle of the kind described consisting of a body provided with running gear and means for propelling the same forwardly or rearwardly, said body provided with a gun turret and with a vertically movable conning tower surmounting the turret, said tower provided with observation ports at the front and rear and means in the tower for controlling its propelling means, said means in the tower being operative to control the vehicle to advance or retire the same at the will of an operator in the tower.

4. In a combat vehicle of the kind described and in combination a chassis provided with a power unit for driving the vehicle, an armored body mounted on the chassis, a gun turret rotatively mounted on the body and having a floor formed with a central opening, a vertically movable conning tower having its upper portion projecting through an opening in the top of the gun turret, with its major portion adapted to be contained within the gun turret, upright guide rails for said tower, mounted on said body and extending up through the opening in the gun turret, and means to raise and lower the tower.

5. In a combat vehicle of the kind described, the combination of a chassis provided with tractor tracks, a motor and transmission for driving the vehicle forward and rearward, an armored body mounted on said chassis, a turret rotatably mounted on said body on a vertical axis, a vertically movable conning tower in said turret with its upper end projecting through an opening in the top of the turret, said conning tower having sight openings at its front and rear above the turret, motor and transmission control means extending to the conning tower, certain members of the control means moving with the tower and relative to the other members of the control means, and actuating levers in the conning tower for actuating said control means.

6. In a combat vehicle of the kind described, the combination of a chassis provided with tractor tracks, a motor and transmission for driving the vehicle forwards and backwards, an armored body mounted on said chassis, said body having a floor and a top formed with an opening therein, a turret rotatably mounted in said body and extending up through the opening in the top thereof, said turret having a floor and a top wall both formed with aligned openings therein, a vertically movable conning tower in said turret and projecting through the opening in the top wall thereof, said conning tower having sight openings at the front and rear above the turret, upright guide members mounted on the floor of the body and projecting up through the opening in the floor of the turret, guide shoes on the conning tower cooperating with the guide members to guide the conning tower in its up and down movements, hydraulic elevating means mounted on the floor of the body for raising and lowering the conning tower, and control means in the conning tower for controlling the operation of the hydraulic elevating means.

7. In a combat vehicle of the kind described, the combination of a chassis provided with a power unit and transmission devices for propelling the vehicle forwards and backwards, an armored body mounted on the chassis, a gun turret rotatably mounted on the body on a vertical axis, a vertically movable conning tower mounted on the body and disposed in the turret with its upper end projecting up from the top of the turret, control means extending from the power unit to the conning tower, certain members of said control means being contained in the body and other control members of the control means being contained in the conning tower and connected to the first named members by extensible and contractible elements.

MARTIN C. SCHWAB.